US012639792B2

(12) United States Patent
Choi et al.

(10) Patent No.: US 12,639,792 B2
(45) Date of Patent: May 26, 2026

(54) METHOD AND APPARATUS WITH IMAGE ENHANCEMENT

(71) Applicant: SAMSUNG ELECTRONICS CO., LTD., Suwon-si (KR)

(72) Inventors: Jae Seok Choi, Yongin-si (KR); Hyong Euk Lee, Suwon-si (KR); Geonseok Seo, Suwon-si (KR); Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 754 days.

(21) Appl. No.: 17/543,901

(22) Filed: Dec. 7, 2021

(65) Prior Publication Data

US 2022/0398695 A1 Dec. 15, 2022

(30) Foreign Application Priority Data

Jun. 14, 2021 (KR) ........................ 10-2021-0076599

(51) Int. Cl.
*G06T 5/70* (2024.01)
*G06F 18/214* (2023.01)
(Continued)

(52) U.S. Cl.
CPC .............. *G06T 5/70* (2024.01); *G06F 18/214* (2023.01); *G06N 20/00* (2019.01); *G06T 5/60* (2024.01);
(Continued)

(58) Field of Classification Search
CPC ... G06T 5/70; G06T 7/80; G06T 2207/20081; G06T 5/60; G06T 2207/20084;
(Continued)

(56) References Cited

U.S. PATENT DOCUMENTS

| 7,428,332 B2 | 9/2008 | Spaulding et al. |
| 9,686,537 B2 | 6/2017 | Geiss et al. |

(Continued)

FOREIGN PATENT DOCUMENTS

| CN | 111292259 A | * | 6/2020 | ............. G06N 3/045 |
| CN | 108055452 B | | 9/2020 | |

(Continued)

OTHER PUBLICATIONS

Nair, T. et al., "Adaptive image denoising using a deep neural network with a noise correction map," Proc. SPIE 11510, Applications of Digital Image Processing XLIII, pp. 1-9, Aug. 21, 2020. (Year: 2020).*

(Continued)

*Primary Examiner* — Emily C Terrell
*Assistant Examiner* — Daniella M. DiGuglielmo
(74) *Attorney, Agent, or Firm* — NSIP Law

(57) ABSTRACT

Methods and apparatuses with training or image enhancement are disclosed. The image enhancement method includes obtaining an input image, estimating a noise distribution of the input image by implementing a noise model based on the input image, and generating an enhanced image by implementing an image enhancement model dependent on the input image and the estimated noise distribution.

19 Claims, 16 Drawing Sheets

(51) Int. Cl.

| | |
|---|---|
| *G06N 20/00* | (2019.01) |
| *G06T 5/60* | (2024.01) |
| *G06T 5/92* | (2024.01) |
| *G06T 7/00* | (2017.01) |
| *G06T 7/80* | (2017.01) |

(52) U.S. Cl.
CPC .................. *G06T 7/80* (2017.01); *G06T 5/92* (2024.01); *G06T 7/0002* (2013.01); *G06T 2207/10004* (2013.01); *G06T 2207/20081* (2013.01); *G06T 2207/20084* (2013.01)

(58) Field of Classification Search
CPC ......... G06T 7/0002; G06T 2207/10004; G06T 5/92; G06F 18/214; G06N 20/00
See application file for complete search history.

(56) References Cited

U.S. PATENT DOCUMENTS

| | | | |
|---|---|---|---|
| 10,262,397 | B2 | 4/2019 | Kounavis |
| 10,909,660 | B2* | 2/2021 | Egiazarian ................. G06T 5/50 |
| 2005/0152612 | A1* | 7/2005 | Spaulding .............. H04N 1/603 |
| | | | 382/254 |
| 2016/0180504 | A1* | 6/2016 | Kounavis .................. G06T 5/40 |
| | | | 348/241 |
| 2019/0095795 | A1* | 3/2019 | Ren ........................ G06T 3/4053 |
| 2019/0130532 | A1 | 5/2019 | Ouyang et al. |

| | | | | |
|---|---|---|---|---|
| 2020/0126190 | A1* | 4/2020 | Lebel ........................ | G06T 5/60 |
| 2020/0349675 | A1 | 11/2020 | Park et al. | |
| 2021/0104021 | A1* | 4/2021 | Sohn ........................ | G06T 5/70 |

FOREIGN PATENT DOCUMENTS

| | | |
|---|---|---|
| JP | 2020-154669 A | 9/2020 |
| KR | 10-0649384 B1 | 11/2006 |
| KR | 10-1703355 B1 | 2/2017 |
| KR | 10-1877215 B1 | 7/2018 |
| KR | 10-2019-0119548 A | 10/2019 |
| KR | 10-2020-0127809 A | 11/2020 |

OTHER PUBLICATIONS

Zhang, K. et al., "Beyond a Gaussian Denoiser: Residual Learning of Deep CNN for Image Denoising," IEEE Transactions on Image Processing, vol. 26, No. 7, pp. 3142-3155, Jul. 2017. (Year: 2017).*

Korean Office Action issued on Nov. 7, 2023, in counterpart Korean Patent Application No. 10-2021-0076599 (4 pages in English, 7 pages in Korean).

Nair, Tejas, et al. "Adaptive image denoising using a deep neural network with a noise correction map." Applications of Digital Image Processing XLIII. vol. 11510. SPIE, Aug. 21, 2020., (9 pages in English).

Extended European search report issued on Nov. 8, 2022, in counterpart European Patent Application No. 21218448.5 (8 pages in English).

* cited by examiner

METHOD AND APPARATUS WITH IMAGE ENHANCEMENT

CROSS-REFERENCE TO RELATED APPLICATIONS

This application claims the benefit under 35 USC § 119(a) of Korean Patent Application No. 10-2021-0076599 filed on Jun. 14, 2021, in the Korean Intellectual Property Office, the entire disclosure of which is incorporated herein by reference for all purposes.

BACKGROUND

1. Field

The following description relates to an method and apparatus with image enhancement.

2. Description of Related Art

As a non-limiting example, a deep learning-based neural network may be used for image enhancement, e.g., with the deep learning-based neural network having been trained based on deep-learning. A neural network may perform an inference according to a trained, for example, purpose by mapping input data and output data that are in a nonlinear relationship with each other, for example. An ability trained to generate such a mapping may be referred to as learning ability. A neural network may have a generalization ability to generate a relatively accurate output for an input pattern that that the neural network was not trained with.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a processor-implemented method with image enhancement includes obtaining an input image, estimating a noise distribution of the input image by implementing a noise model based on the input image, and generating an enhanced image by implementing an image enhancement model dependent on the input image and the estimated noise distribution.

The obtaining of the input image may include capturing the input image using a camera.

The estimating of the noise distribution may include implementing the noise model based on pixel data of the input image, pixel position information of the input image, and capturing parameters of the input image.

The capturing parameters may include, related to the input image, at least one of an International Organization for Standardization (ISO) value, an exposure time, and Bayer pattern information.

The noise model may be a regression model that has been trained in advance of the obtaining of the input image, and the noise model may provide a mapping relationship between input image data, pixel position information of the input image data, and corresponding capturing parameters for the input image data, and outputs noise distribution data.

The method may further include generating the noise model by training an in-training noise model to have a mapping relationship between input image data, pixel position information of the input image data, and corresponding capturing parameters for the input image data, and to output noise distribution data.

The method may further include generating the image enhancement model by training an in-training image enhancement model to have a mapping relationship between an output enhanced image data and input image data, pixel position information of the input image data, and corresponding capturing parameters for the input image data.

The noise model may be an in-training noise model and/or the image enhancement model may be an in-training image enhancement model.

The noise model may be configured to estimate the noise distribution of the input image based on respective distances from a center of the input image to each of a plurality of pixels of the input image.

The noise distribution may include a variance or standard deviation of noise values of pixels of the input image.

The generating of the enhanced image may include generating input data by concatenating the input image and the estimated noise distribution, and implementing the image enhancement model with the generated input data.

The image enhancement model may be a machine learning model that has been trained in advance of the obtaining of the input image, and the trained enhancement model may provide a mapping relationship between input image data and a corresponding estimated noise distribution and outputs enhanced image data.

The method may further include generating the image enhancement model by training the image enhancement model based on training images generated through use of the noise model.

In one general aspect, a non-transitory computer-readable storage medium is provided storing instructions that, when executed by a processor, cause the processor to perform any one, any combination, or all operations or methods described herein.

In one general aspect, a processor-implemented method includes training a noise model based on training images and corresponding pixel position information, implementing the trained noise model for generating a degraded training image of a clean training image provided to the trained noise model, determining a training data set based on the clean training image and the degraded training image, and training an image enhancement model based on the training data set.

The method may further include capturing an input image, estimating a noise distribution of the input image by implementing the trained noise model based on the input image, generating a degraded image of the input image based on the input image and the noise distribution of the input image, and generating an enhanced image by implementing the trained image enhancement model based on the input image and the degraded image of the input image.

The training of the noise model may include generating a first clean training image from a first noise training image, determining a noise component of the first noise training image based on a difference between the first noise training image and the first clean training image, and training the noise model to have a mapping relationship dependent on a distribution of the noise component, pixel data of the first clean training image, and the pixel position information.

The determining of the noise component may include determining Gaussian noise pixel data and Gaussian clean pixel data by applying a Gaussian data transformation to first noise pixel data of the first noise training image and first clean pixel data of the first clean training image, and determining the noise component based on a difference between the Gaussian noise pixel data and the Gaussian clean pixel data.

The training of the noise model may include training the noise model based on capturing parameters of the first noise training image, where the capturing parameters may include at least one of an International Organization for Standardization (ISO) value, an exposure time, or Bayer pattern information.

The training of the noise model may include removing a clipping effect of pixel values of the training images, through declipping.

The generating of the degraded training image may include determining a noise distribution corresponding to a degradation condition by providing the clean training image and the degradation condition to the noise model, and generating the degraded training image by applying the noise distribution to the clean training image.

The determining of the training data set may include generating a training input by concatenating the noise distribution and the degraded training image.

The generating of the degraded training image may include applying a blur effect to the clean training image using a blur model.

In one general aspect, an apparatus with image enhancement includes a processor configured to estimate a noise distribution for an obtained input image by implementing a noise model based on the input image, and generate an enhanced image by implementing an image enhancement model, for the input image, dependent on the input image and the estimated noise distribution.

The processor may be further configured to implement the noise model based on pixel data, pixel position information, and capturing parameters of the input image.

The noise model may be a trained or in-training noise model, and/or the image enhancement model may be a trained or in-training image enhancement model.

The apparatus may further include a camera that obtains the input image, and a memory storing instructions, which when executed by the processor, configures the processor to perform the estimating of the noise distribution and the generating of the enhanced image, where the apparatus may be a mobile phone electronic device.

In one general aspect, an electronic apparatus includes a processor configured to implement a noise model to generate plural noise distributions, for an image, respectively based on plural capturing parameters for the image and pixel information of the image, generate, using the generated plural noise distributions, plural degraded images for the image, and train an image enhancement model dependent on the plural degraded images.

The noise model may be a trained noise model, and the electronic apparatus may be a mobile phone.

In one general aspect, an electronic apparatus includes a camera that captures an input image, and a processor configured to estimate a noise distribution of the input image by an implementation of a noise model that considers pixel information of the input image and considers capturing parameters of the camera when the input image was captured and/or plural respective pixel position information of the input image, and generate an enhanced image of the input image by an implementation of an image enhancement model, where the implementation of the image enhancement model is dependent on the input image and the estimated noise distribution.

The electronic apparatus may be a mobile phone.

Other features and aspects will be apparent from the following detailed description, the drawings, and the claims.

Figure 1:
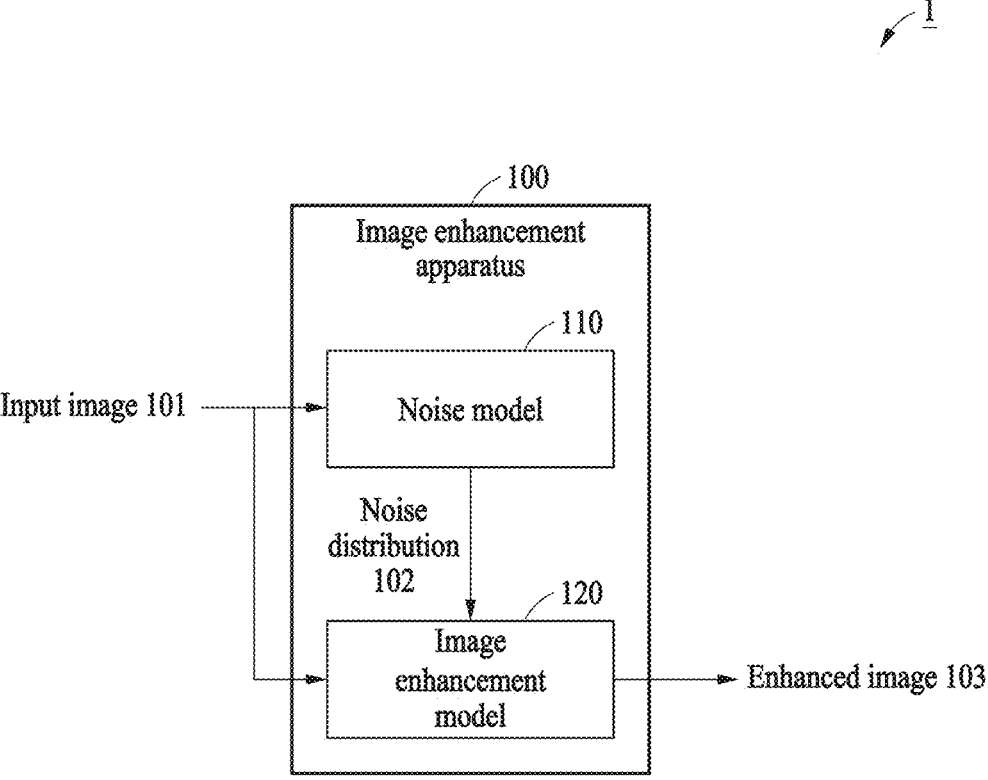
FIG. 1 illustrates an example of image enhancement, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, each of expressions, "between" and "immediately between," for example, and "adjacent to" and "immediately adjacent to," for example, should also be respectively construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

FIG. 1 illustrates an example of image enhancement, according to one or more embodiments. Referring to FIG. 1, an example electronic apparatus 1 may include an image enhancement apparatus 100 that may receive an input image 101, and generate an enhanced image 103 by enhancing an image quality of the input image 101 using a noise model 110 and an image enhancement model 120. For example, the electronic apparatus 1 may be, or may be implemented as at least a portion of, for example, a mobile device such as a mobile phone, a smartphone, a personal digital assistant (PDA), a netbook, a tablet computer, a laptop computer, and the like, a wearable device such as a smart watch, a smart band, smart glasses, and the like, a computing device such as a desktop, a server, and the like, a home appliance such as a television (TV), a smart TV, a refrigerator, and the like, a security device such as a door lock and the like, and a vehicle such as an autonomous vehicle, a smart vehicle, and the like, as non-limiting examples.

As non-limiting examples, the input image 101 may be generated by a camera, received through a network interface, and/or stored in advance in a storage device, e.g., of the example electronic apparatus 1 as a non-limiting example. As a non-limiting example, the electronic apparatus 1 may be or correspond to the electronic apparatus 2000 of FIG. 20. The input image 101 may include a degradation aspect (e.g., noise, blur, etc.), and the image enhancement apparatus 100 may perform a removal of the degradation aspect using the noise model 110 and the image enhancement model 120. For example, the degradation aspect may be removed or substantially removed.

The image enhancement apparatus 100 may estimate a noise distribution 102 of the input image 101 by implementing the noise model 110 based on the input image 101. The noise model 110 may be a regression model that learns and/or is trained in advance, e.g., prior to an inference operation with respect to the input image 101, with a mapping relationship between an input image data and output data corresponding to a noise distribution. The output noise distribution 102 may represent a distribution of noise values of pixels of the input image 101. The noise distribution 102 may include, for example, a variance and/or standard deviation of the noise values.

The image enhancement apparatus 100 may generate the enhanced image 103 by implementing the image enhancement model 120 based on the input image 101 and the noise distribution 102 generated by the noise model. The image enhancement model 120 may be a machine learning model, e.g., that learns and/or is trained in the advance, to have a mapping relationship between input image data and a noise distribution, and which outputs data corresponding to an enhanced image. As a non-limiting example, the image enhancement model 120 may include, for example, a deep learning network. In such an example, the image enhancement model 120 and the noise model 110 may respectively perform inference operations according to one or more respectively trained, for example, purposes by mapping input data and output data that are in nonlinear relationships with each other. Training of or learning by the noise model 110 and/or the image enhancement model 120 may be based on supervised and/or unsupervised learning.

Figure 2:
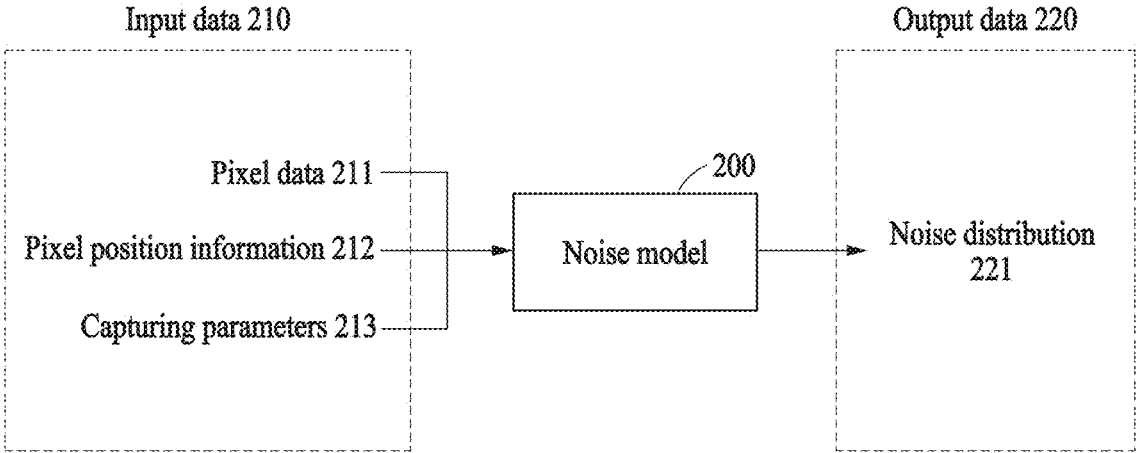
FIG. 2 illustrates an example of estimating noise by a noise model, according to one or more embodiments.

FIG. 2 illustrates an example of estimating noise by a trained/learned noise model, according to one or more embodiments. Referring to FIG. 2, a noise model 200 may be trained/learned in advance, e.g., to have a mapping relationship between input data and output data based on various training images. When the input data 210 of an input image is given, the noise model 200 may estimate the output data 220 corresponding to the input data 210. The input data 210 may include pixel data 211, pixel position information 212, and capturing parameters 213 (e.g., the capturing parameters 213 of a captured input image or various modeled-training capturing parameters 213), as a non-limiting example. The output data 220 may include a noise distribution 221, for example. When the pixel data 211, the pixel position information 212, and the capturing parameters 213 are given, for example, the noise model 200 may estimate the noise distribution 221 corresponding to the pixel data 211, the pixel position information 212, and the capturing parameters 213. Likewise, the noise model 200 may have been trained based on the input of such multiple types of input data to the in-training noise model, i.e., instead of just pixel data.

For example, when the input image is given, the noise model 200 may estimate the noise distribution 221 of the input image based on each of the pixel data 211, the pixel position information 212, and the capturing parameters 213 of the input image. The pixel data 211 may include pixel values of the input image, for example. The pixel position information 212 may include pixel coordinate values and/or distances from the center, as a non-limiting example. As the pixel data 211 of the input image, clean pixel data of a clean version of the input image may be used. The capturing parameters 213 may include image capturing information of the input image, for example, an International Organization for Standardization or International Standards Organization (ISO) value, an exposure time, and Bayer pattern information, as non-limiting examples. The exposure time may correspond to a shutter speed, for example. The Bayer pattern information may include information associated with a filter color (e.g., red, green, blue (RGB)) used in the pixel data 211, for example. The noise model 200 may estimate the noise distribution 221 that is an estimation that is close to a real or natural noise distribution, using various sets of information including, for example, the pixel data 211, the pixel position information 212, and the capturing parameters 213, for example.

Figure 3:
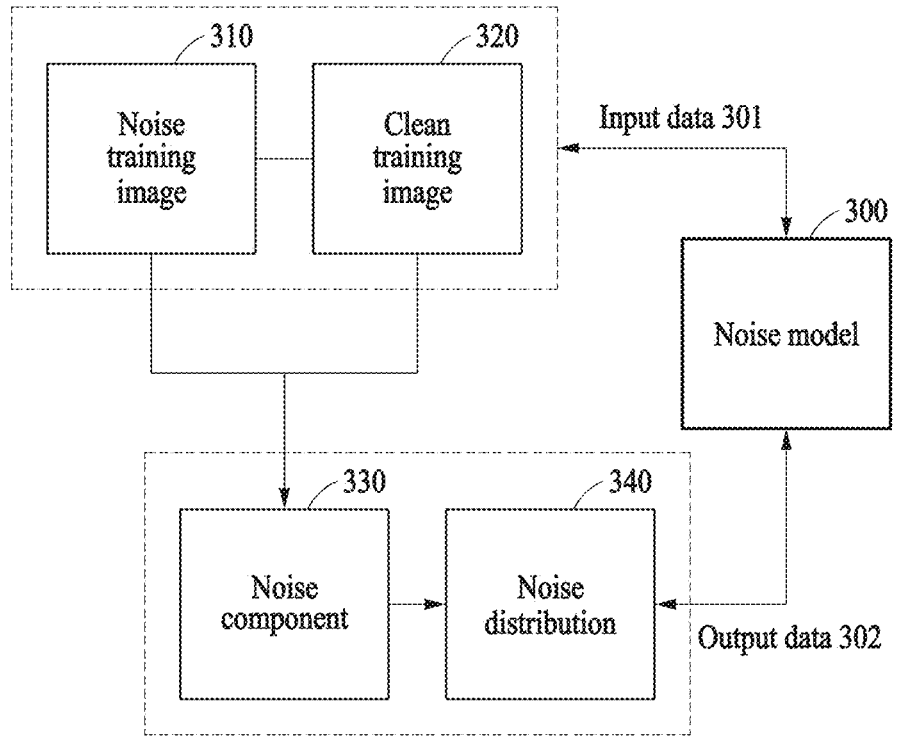
FIG. 3 illustrates an example of training a noise model, according to one or more embodiments.

FIG. 3 illustrates an example of training a noise model, according to one or more embodiments. Referring to FIG. 3, a clean training image 320 (i.e., a clean training-modeling image 320) may be generated based on a noise training image 310 (i.e., a noise training-modeling image 310). For example, the noise training image 310 may be obtained by capturing an image of a flat mono-color (e.g., gray) plate (or herein may be a modeling of such a captured image, e.g., based on a pre-stored image considered to be the captured image), and the clean training image 320 may be obtained through blur filtering performed on the noise training image 310. In this example, the clean training image 320 may correspond to a pseudo clean image. For example, the noise training image 310 may correspond to a raw version of the captured image or raw version of a modeled captured image (e.g., based on a pre-stored image considered to be the captured image), for example, or a version obtained by applying some postprocessing to the raw version of the example captured image, or the modeled or pre-stored captured image. A noise component 330 and a noise distribution 340 of the noise training image 310 may be determined based on a difference between the noise training image 310 and the clean training image 320. The noise distribution 340 may include a distribution (e.g., a variance and/or standard deviation) of noise values of pixels of the noise training image 310. For example, the noise distribution 340 may include a square value of each difference value.

Based on the training images 310 and 320, input data 301 may be constructed. Based on noise data including, for example, the noise component 330 and the noise distribution 340, output data 302 may be constructed. For example, the input data 301 may be determined by clean pixel data of the clean training image 320, pixel position information of the training images 310 and 320, and capturing parameters of the noise training image 310, and the output data 302 may be determined by the noise distribution 340. The clean pixel data may include pixel values of the clean training image 320. As an example, the respective sizes of the training images 310 and 320 may be the same, and the pixel position information may include pixel coordinate values and/or distances from the center, as a non-limiting example, of the training images 310 and 320. As non-limiting examples, the capturing parameters may include an ISO value, an exposure time, and Bayer pattern information that are used when the noise training image 310 is captured or modeled as having been captured (e.g., based on a pre-stored image considered to be the captured image).

A noise model 300 may learn or be trained, or have been learned or trained, with a mapping relationship between the input data 301 and the output data 302. A regression analysis may be used for training the noise model 300, and the noise model 300 may correspond to a regression model, for example. As a non-limiting example, the regression analysis may correspond to a ridge regression. Thus, the noise model 300 may estimate the output data 302 corresponding to the given input data 301. For example, when pixel data (e.g., clean pixel data), pixel position information, and capturing parameters of an input image are given as the input data 301, the noise model 300 may estimate the noise distribution 340 corresponding to the input data 301.

In one example, two-dimensional (2D) maps may be determined based on pixel data, pixel position information, and capturing parameters, respectively. The maps may constitute the input data. Each component of the 2D map that is based on the pixel data may have a pixel value based on a pixel position of the pixel data. Each component of the 2D map that is based on the pixel position information may have a distance value from the center, as a non-limiting example. All components of the 2D map that is based on the capturing parameters may have the same parameter value. For example, all map components of the 2D map that is based on an ISO parameter may have the same value according to ISO settings. The noise distribution 340 may represent a distribution (e.g., a variance and/or standard deviation) of noise values of pixels of the pixel data as a 2D map according to a pixel position of the pixel data.

The training of the noise model 300 may be repeatedly performed using various training images, i.e., various training-modeling images. For example, various noise training images may be generated by capturing an image of an object (e.g., a flat mono-color plate), or generated based on a modeled capturing of the image of the object (e.g., based on a pre-stored image considered to be the captured image), in various image capturing environments (e.g., illuminance, etc.) and under various image capturing conditions (e.g., ISO value, exposure time, etc.), and corresponding clean training images, noise components, and noise distributions may be derived therefrom. When modeling or generating pairs of the input data 301 and the output data 302 corresponding to the noise training images are constructed, the noise model 300 may repeatedly learn or be trained to have a mapping relationship with respect to the modeling/generated pairs.

For example, the noise model 300 may learn or be trained for a mapping relationship between 2D maps respectively corresponding to the pixel data, the pixel position information, and the capturing parameters, and a 2D map corresponding to the noise distribution 340. In this example, instead of directly mapping values of map components of each of the 2D maps, square values of the values of the map components may be mapped. Thus, the noise model 300 may output the noise distribution 340 of the input image in response to an input of the 2D maps corresponding to the pixel data, the pixel position information, and the capturing parameters of the input image. The noise distribution 340 may have a heteroscedastic characteristic in which a standard deviation is concentrated in a narrow range in a segment with a low pixel value and a standard deviation is widely spread in a segment with a high pixel value, and thus weighted regression (e.g., weighted linear regression) that assigns a high weight to a low pixel may be used. In addition, to apply actual noise of a bias frame obtained in an environment with little or no light, weighted regression (e.g., weighted linear regression) of a rectified type may be applied to a segment with an extremely low pixel value, for example.

Figure 4:
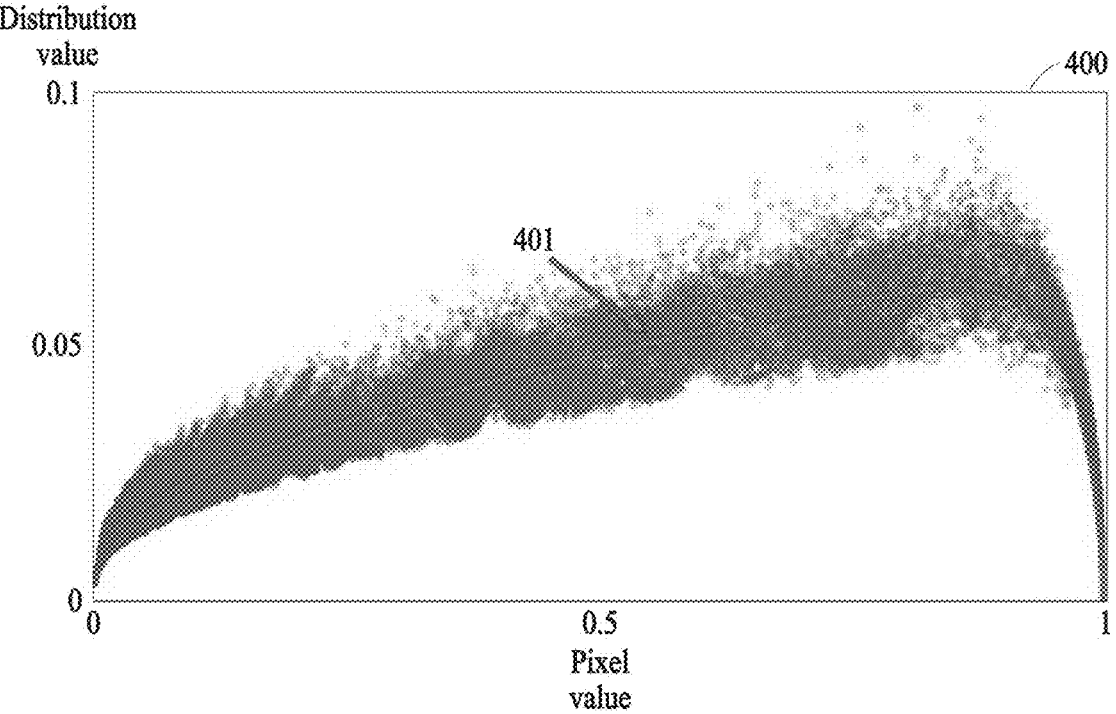
FIG. 4 illustrates an example of a mapping model based on pixel data and noise distribution, according to one or more embodiments.

FIG. 4 illustrates an example of a mapping model based on pixel data and noise distribution, according to one or more embodiments. Referring to FIG. 4, points in the illustrated graph 400 indicate distribution values based on pixel values. A pixel value used herein may indicate a pixel brightness, and a distribution value used herein may indicate a noise distribution (e.g., a variance and/or standard deviation), for example. The points in the graph 400 were derived based on pixel values and distribution values of various images. For example, such points a corresponding graph alike graph 400 may be derived based on pixel values and distribution values of the various training images discussed above with respect to FIG. 3, or based on pixel values and distribution values of various inference images applicable to inference operations using the trained noise model. For example, a clean pixel value of a segment of an image may be derived based on an average of pixel values of the segment of the image, and a distribution value of a noise component may be derived based on a difference between the pixel values and the clean pixel value of the segment. A pair of the clean pixel value (or the average pixel value) and the distribution value that are derived as described in the foregoing may be indicated as a point corresponding to the segment in the graph 400.

The illustrated curve 401 has been derived through a regression analysis based on the points in the graph 400. The curve 401 may represent a mapping relationship between the pixel values and the distribution values. Based on the curve 401, a noise distribution corresponding to pixel values of an input image may be determined. The curve 401 may correspond to a heteroscedastic model that assumes that a distribution value varies according to a pixel value. A noise model may more realistically model noise based on additional information, for example, pixel position information and capturing parameters, in addition to pixel data.

Figure 5:
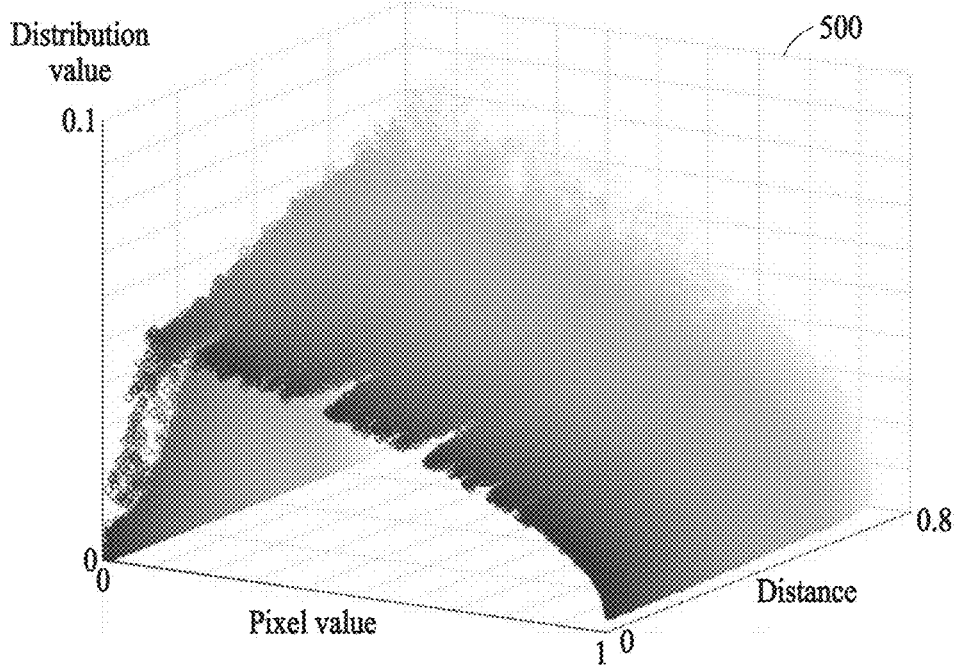
FIG. 5 illustrates an example of a mapping model based on pixel data, pixel position information, and noise distribution, according to one or more embodiments.

FIG. 5 illustrates an example of a mapping model based on pixel data, pixel position information, and noise distribution, according to one or more embodiments. Referring to FIG. 5, points in the illustrated graph 500 represents an example model that maps pixel data and pixel position information to a noise distribution. The pixel data, the pixel position information, and the noise distribution may correspond to a pixel value, a distance, and a distribution value of the graph 500. The mapping model of the graph 500 has been, and may be in various examples, derived based on pixel values, distance values, and distribution values of various images. For example, a corresponding graph alike graph 500 may be derived based on pixel values, distance values, and distribution values of the various training images discussed above with respect to FIG. 3, or based on pixel values, distance values, and distribution values of various inference images applicable to inference operations using the trained noise model. For example, 2D maps may be derived based on pixel data, pixel position information, and noise distributions of the images, and the mapping model may be derived based on a mapping relationship between the 2D maps. Compared to the model illustrated in FIG. 4, the model of the graph 500 estimates the noise distribution based further on a distance from an image center, for example, to each pixel. In addition, based further on capturing parameters, the model of the graph 500 may learn or be trained with a more detailed or sophisticated mapping relationship.

Figure 6:
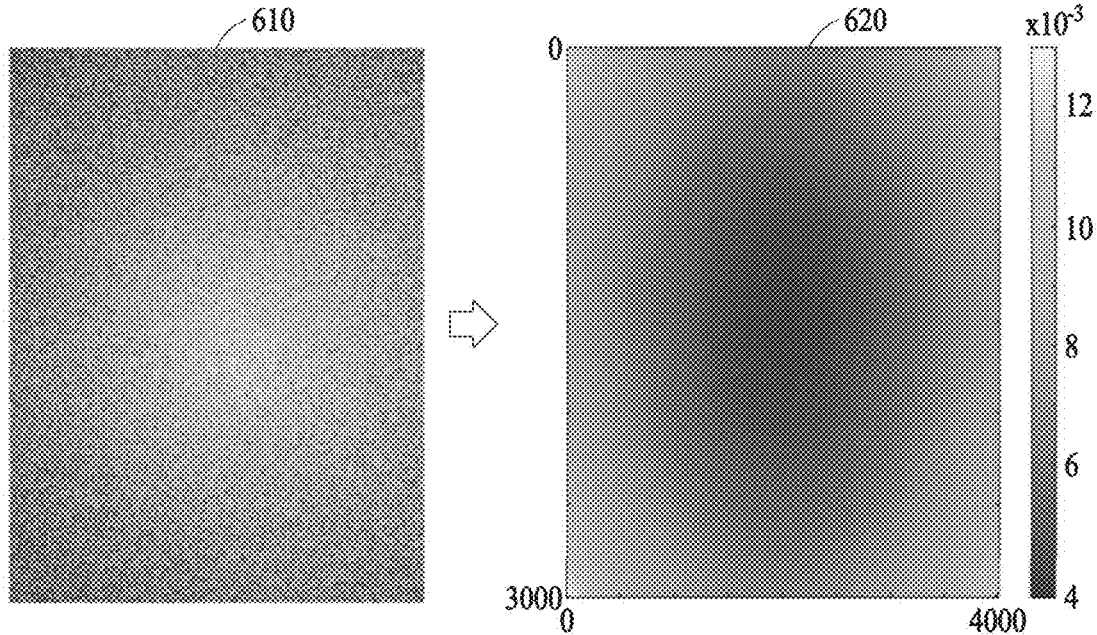
FIG. 6 illustrates an example of an actual noise image and an example of a noise distribution map, according to one or more embodiments.

FIG. 6 illustrates an example of an actual noise image and an example of a noise distribution map, according to one or more embodiments. A noise image 610 may be obtained by capturing an image of an example flat mono-color (e.g., gray) plate or obtained as a modeled captured image (e.g., based on a pre-stored image considered to be the captured image) of the example flat mono-color plate, and a noise distribution map 620 may be derived through training using the noise image 610. The noise distribution map 620 may represent a mapping relationship based on pixel data, pixel position information, and noise distribution. For example, the noise distribution map 620 may correspond to the model illustrated in FIG. 5. A change in distribution value based on a distance from an image center, for example, to each pixel may be applied to the noise distribution map 620. When capturing parameters are further applied, a mapping relationship between input data corresponding to the pixel data, the pixel position information, and the capturing parameters and output data corresponding to the noise distribution may be derived. A noise model (or a trained noise model) that learns or is trained (or has been trained) to have such a mapping relationship, may consider additional information such as the pixel position information and the capturing parameters, and thus more realistically estimate actual noise compared to when a model for estimating noise learns or is trained with only the pixel data.

Figure 7:
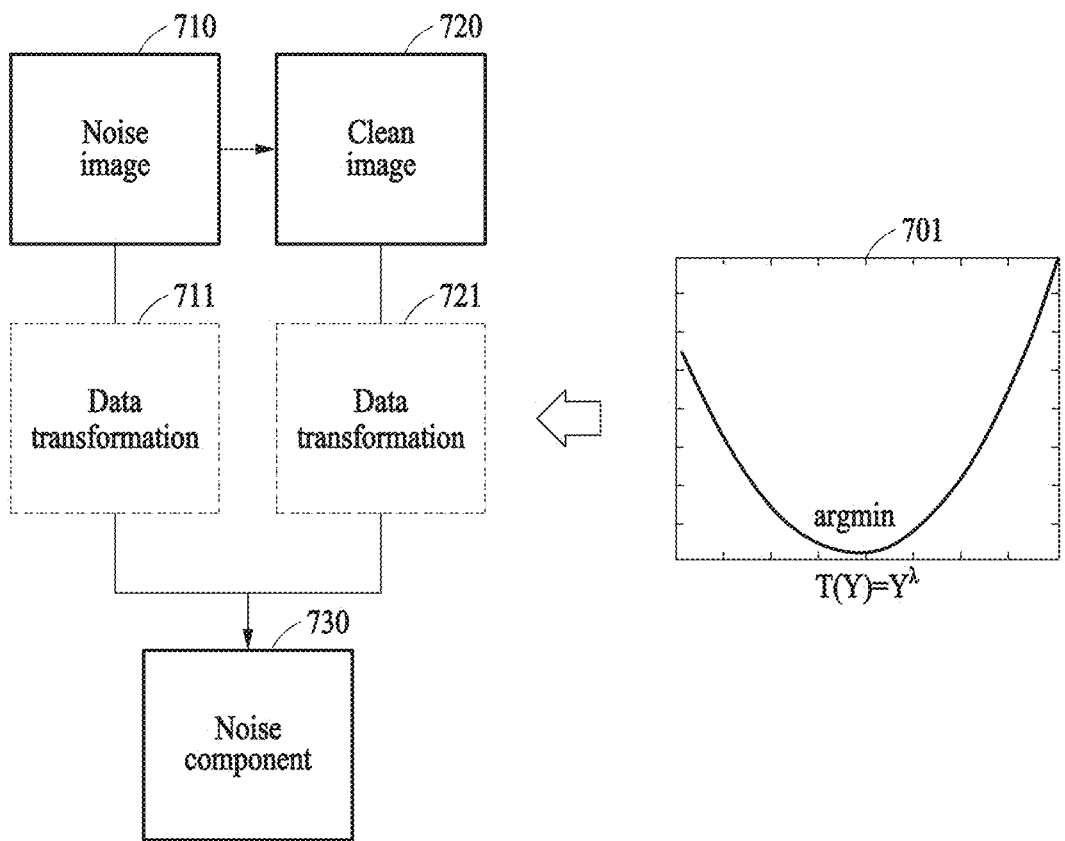
FIG. 7 illustrates an example of applying a Gaussian distribution through a data transformation, according to one or more embodiments.

FIG. 7 illustrates an example of applying a Gaussian distribution through a data transformation, according to one or more embodiments. It may be assumed that, when modeling noise, modeling data follows a Gaussian distribution. However, actual data (e.g., captured data) used for modeling the noise (e.g., during training or inference operations) may not follow the Gaussian distribution. In such a case, the actual data may be transformed to follow the Gaussian distribution and then be used for training, for example. Referring to FIG. 7, new pixel data that follows the Gaussian distribution may be determined through data transformations 711 and 721 performed on pixel data of images 710 and 720, e.g., of the training or the inference operations. The data transformations 711 and 721 may also be referred to as Gaussian data transformations. The new pixel data of the noise image 710 may also be referred to as Gaussian noise pixel data, and the new pixel data of the clean image 720 may also be referred to as Gaussian clean pixel data.

A difference between the images 710 and 720 may be calculated based on the new pixel data, and a noise component 730 may be derived based on the difference. As a result, the noise component 730 may follow the Gaussian distribution. For example, the data transformation 711 may include a power transformation such as the equation T(Y) =Y$^\lambda$ illustrated in FIG. 7. In this illustrated equation, T denotes a power transformation function, Y denotes actual data, and λ denotes a transformation value. Thus, the illustrated graph 701 may represent a difference between a distribution of the actual data that is based on a value of λ and the Gaussian distribution (or a normal distribution). When a value of λ that minimizes the difference (e.g., 0.94) is determined, the power transformation based on the value of λ may be applied to the images 710 and 720.

Figure 8:
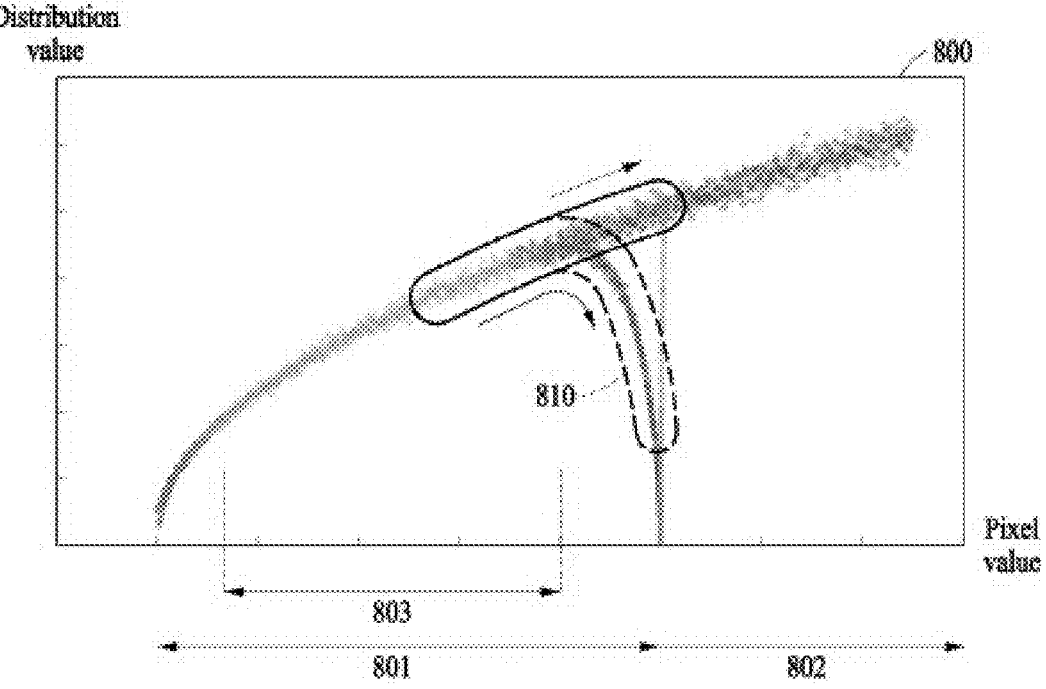
FIG. 8 illustrates an example of suppressing a clipping effect through declipping, according to one or more embodiments.

FIG. 8 illustrates an example of suppressing a clipping effect through declipping, according to one or more embodiments. Points in the illustrated graph 800 of FIG. 8 represent an example relationship between pixel values and distribution values. Pixels of an image sensor and/or image may not fully reflect the brightness of real light present in nature. For example, a first range 801 may represent brightness that may be represented by pixels, and a second range 802 may represent real light brightness that may not be represented by pixels. Based solely on pixel values of the pixels in the first range 801, a clipping effect may occur as shown in a first region 810 due to a limitation of the representation of the pixel values. That is, as a limiting line of the representation is closer, a clip may occur because actual data is not applied.

The clipping effect may be removed by performing declipping such that data of the second range 802 is applied. For example, by performing declipping (e.g., during training or inference operations) based on a data distribution of images, the clipping effect occurring due to a limitation of the representation of pixel values of the images may be removed. In another example, data of a third range 803 may be extracted and used for noise modeling. In this example, data of a remaining portion in the first range 801 from which the third range 803 is excluded may be estimated (e.g., interpolated or extrapolated) based on the data of the third range 803. Thus, in addition to the third range 803 being used for noise modeling, a combination of the third range 803 and the estimated remaining portion of the first range 801 may be used for noise modeling.

Figure 9:
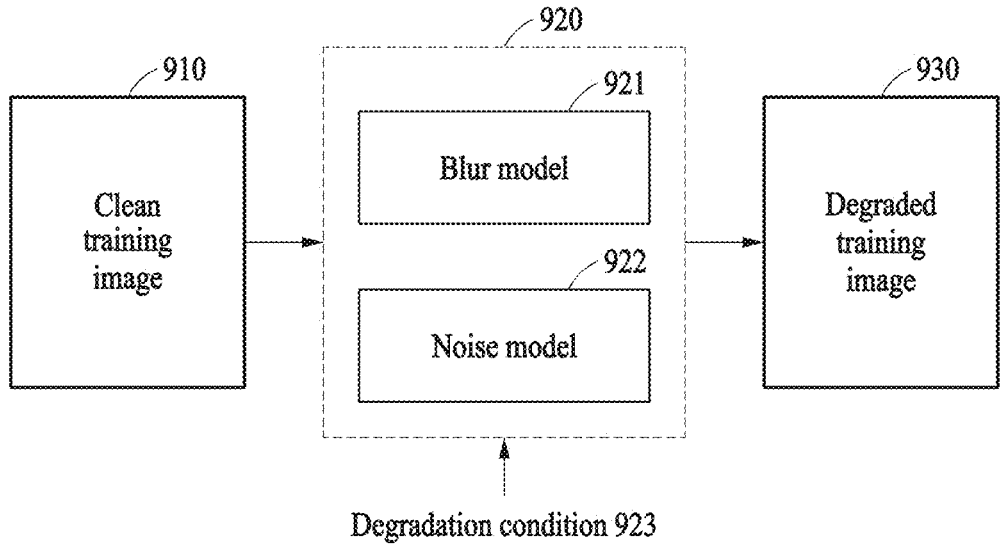
FIG. 9 illustrates an example of generating a training image, according to one or more embodiments.

FIG. 9 illustrates an example of generating a training image, according to one or more embodiments. Referring to FIG. 9, a degradation model 920 may include a blur model 921 and a noise model 922, for example. The blur model 921 may add a blur effect to a clean training image 910, and the noise model 922 may add a noise effect to the clean training image 910. When the blur effect and the noise effect are applied to the clean training image 910, a degraded training image 930 may be generated. For example, when the blur model 921 generates a blurred image by adding the blur effect to the clean training image 910, the noise model 922 may generate the degraded training image 930 by adding the noise effect to the blurred image. However, the order in which the blur effect and the noise effect are added is not limited to the foregoing example.

The degradation model 920 may generate the degraded training image 930 based on a degradation condition 923. Each degradation aspect may be set based on the degradation condition 923. The degradation condition 923 may include a blur condition associated with the blur effect and a noise condition associated with the noise effect, for example. As an example, the blur condition may include motion information, and the blur model 921 may generate the blurred image based on the clean training image 910 and the motion information. The noise condition may include pixel position information and capturing parameters, and the noise model 922 may generate the degraded training image 930 based on pixel data, pixel position information, and capturing parameters of the blurred image.

As described in greater detail further below, a training data set may be determined based on the clean training image 910 and the degraded training image 930, and an image enhancement model may be trained based on the training data set. For the training of the image enhancement model, various training data sets may be needed. By changing the degradation condition 923, various versions of the degraded training image 930 may be generated from the same clean training image 910. Further, by changing the degradation condition 923 and the clean training image 910, more diverse versions of the degraded training image 930 may be generated. For example, by adjusting an exposure time, a long-exposure degraded training image and a short-exposure degraded training image may be generated as the degraded training image 930. In this example, realism of the degraded training image 930 may be enhanced by adding blurs of long-exposure and short-exposure characteristics to the degraded training image 930.

Figure 10:
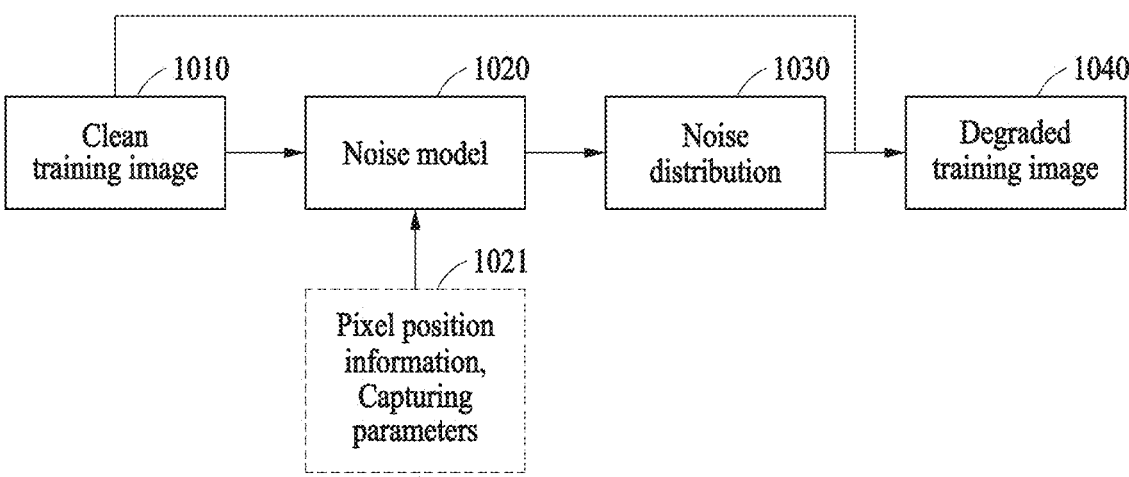
FIG. 10 illustrates an example of generating a degraded training image by estimating noise distribution by a noise model, according to one or more embodiments.

FIG. 10 illustrates an example of generating a degraded training image by estimating a noise distribution by a noise model, according to one or more embodiments. Referring to FIG. 10, a noise model 1020 (e.g., a trained/learned noise model 1020) may estimate a noise distribution 1030 based on a clean training image 1010 and a degradation condition 1021. For example, the noise model 1020 may estimate the noise distribution 1030 based on pixel data, pixel position information, and capturing parameters of the clean training image 1010. When a degradation effect is applied to the clean training image 1010, pixel data of a degraded image may be used instead of the pixel data of the clean training image 1010. A degraded training image 1040 may be derived based on the clean training image 1010 and the noise distribution 1030. For example, a noise map may be generated by concatenating (for example, multiplying) a noise distribution map representing the noise distribution 1030 and a Gaussian random map, and the degraded training image 1040 may be generated by applying (for example, adding) the noise map to the clean training image 1010. The Gaussian random map may be extracted from a Gaussian random distribution with an average of 0 and a standard deviation of 1. The clean training image 1010, the noise distribution 1030, and the degraded training image 1040 may be included in a training data set.

Figure 11:
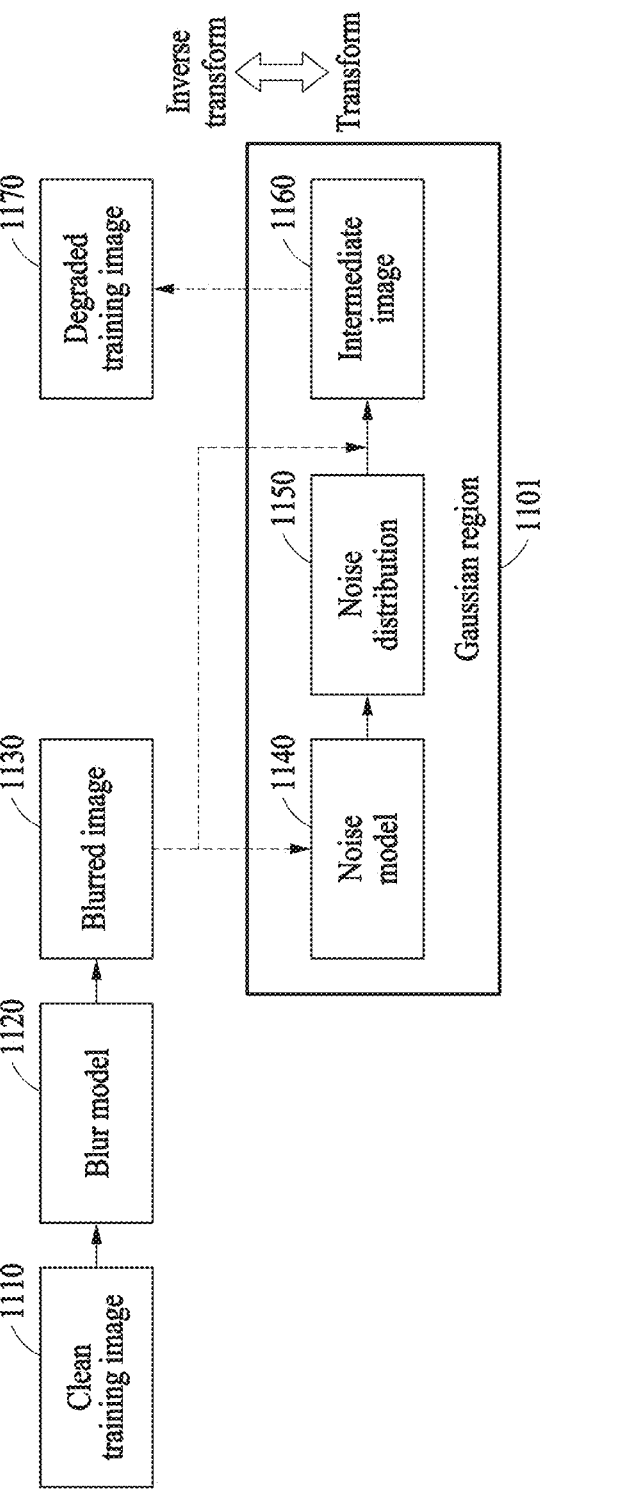
FIG. 11 illustrates an example of a data transformation in a process of generating a degraded training image, according to one or more embodiments.

FIG. 11 illustrates an example of a data transformation in a process of generating a degraded training image, according to one or more embodiments. As described above, it may be assumed that, in a process of performing noise modeling using a noise model 1140 (e.g., a trained/learned noise model 1140), the modeling data follows a Gaussian distribution. However, actual data used for modeling may not follow the Gaussian distribution. In this case, the actual data may be transformed to follow the Gaussian distribution and then be used for training of an image enhancement model, as a non-limiting example. The process of generating the training image may also be applicable to an inference operation to generate a degraded image. Referring to FIG. 11, a blur model 1120 may generate a blurred image 1130 based on a clean training image 1110. Through a data transformation performed on pixel data of the blurred image 1130, new pixel data that follows the Gaussian distribution may be determined. A noise model 1140 may then estimate a noise distribution 1150 based on the new pixel data, pixel position information, and capturing parameters. Through the data transformation, noise modeling may be performed in a Gaussian region 1101. The noise distribution 1150 may be applied to the Gaussian region 1101, and thus an intermediate image 1160 may be determined. A degraded training image 1170 may then be determined through an inverse transformation performed on the intermediate image 1160. For example, a power transformation function may be used for the data transformation, and an inverse power transformation function may be used for the inverse data transformation.

Figure 12:
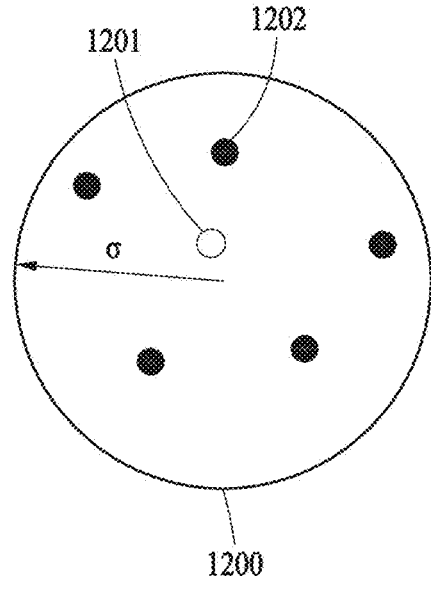
FIGS. 12 and 13 illustrate examples of generating a blur, according to two or more embodiments.
Figure 13:
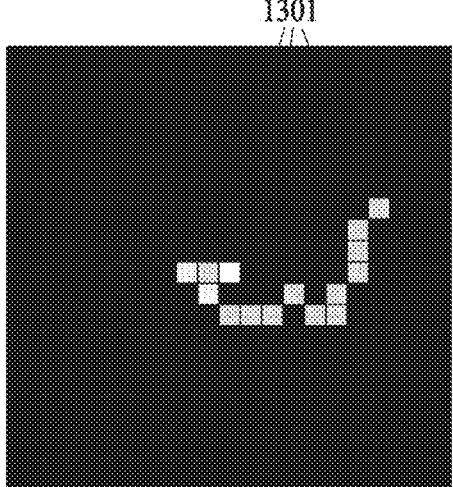

FIGS. 12 and 13 illustrate examples of generating a blur, according to two or more embodiments. The generating of the blur may be applicable to the training or the inference operations. In one example, a blur model may generate a blurred image using a Gaussian distribution illustrated in FIG. 12. Referring to FIG. 12, the blur model may shift an input image based on shift points including a shift point 1202. The input image may be a clean training image, as a non-limiting example. The shift points may be extracted from a distribution region 1200 based on a Gaussian distribution with a standard deviation of σ, for ex ample, a bivariate Gaussian distribution. The blur model may generate the blurred image corresponding to a target point 1201 by averaging shift images. The target point 1201 may correspond to an average position of the shift points.

In another example, the blur model may generate a blurred image using a motion blur kernel illustrated in FIG. 13. Referring to FIG. 13, pixels 1301 may represent shift points of an input image. The pixels 1301 may be obtained through a motion blur kernel and/or a sensor (e.g., an accelerometer, a gyroscope, etc.). The blur model may generate shift images corresponding to the shift points. A pixel value of each of the pixels 1301 may represent a weight of a corresponding shift point, and the blur model may generate the blurred image by calculating a weighted average of the shift images based on the weight. The example of FIG. 12 may represent a discontinuous motion, which may have high rigidity. The example of FIG. 13 may represent a continuous motion.

Figure 14:
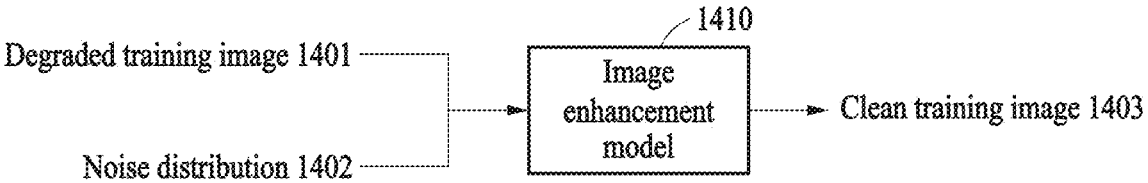
FIG. 14 illustrates an example of training an image enhancement model, according to one or more embodiments.

FIG. 14 illustrates an example of training an image enhancement model, according to one or more embodiments. Referring to FIG. 14, an image enhancement model 1410 may be trained based on a degraded training image 1401, a noise distribution 1402, and a clean training image 1403. The degraded training image 1401, the noise distribution 1402, and the clean training image 1403 may correspond to a training data set. As described above, a degradation model may generate the degraded training image 1401 and the noise distribution 1402 based on the clean training image 1403, and the degraded training image 1401, the noise distribution 1402, and the clean training image 1403 may constitute the training data set. The image enhancement model 1410 may be trained to have a mapping relationship between input data corresponding to the degraded training image 1401 and the noise distribution 1402 and output data corresponding to the clean training image 1403. Thus, using a trained image enhancement model, when an input image and a noise distribution of the input image are given, the image enhancement model 1410 may have an ability to infer an enhanced image of the input image.

The image enhancement model 1410 may be a machine learning model, for example. As a non-limiting example the image enhancement model 1410 may include, for example, a deep learning network. The image enhancement model 1410 may perform image enhancement, e.g., based the image enhancement model 1410 having been trained to have a mapping of input data and output data that are in a nonlinear relationship with each other based on supervised and/or unsupervised learning. Based on the degraded training image 1401 and the noise distribution 1402, training input data for the image enhancement model 1410 may be determined. For example, the training input data may be determined by concatenating the degraded training image 1401 and the noise distribution 1402. The clean training image 1403 may be determined to be training output data. The image enhancement model 1410 may be repeatedly trained to generate the training output data based on the training input data.

Figure 15:
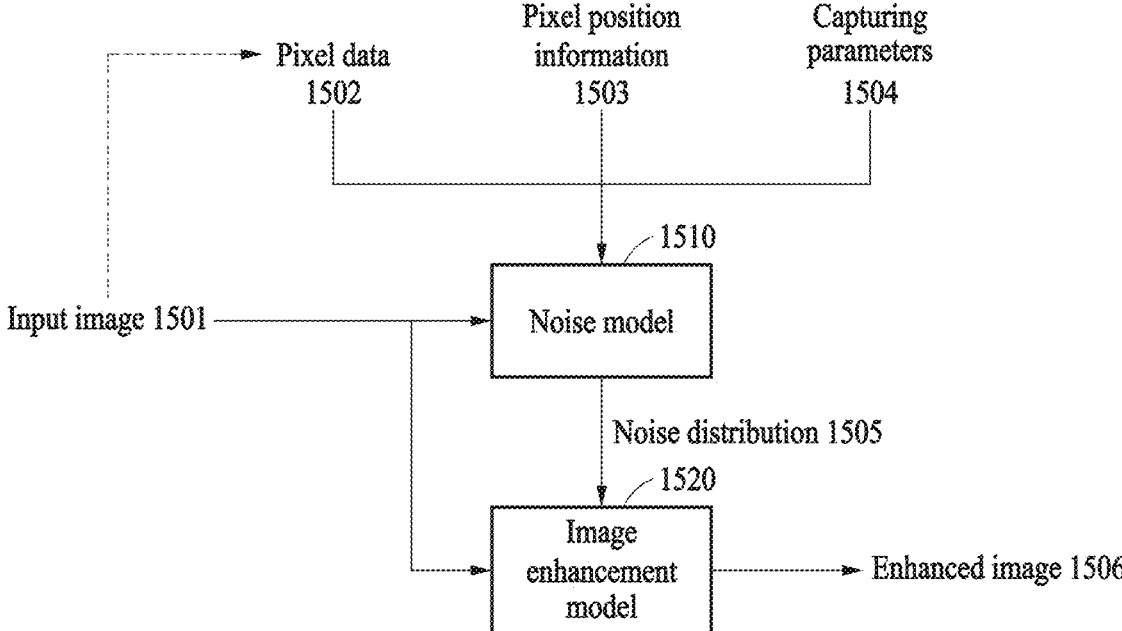
FIG. 15 illustrates an example of enhancing an image using a noise model and an image enhancement model, according to one or more embodiments.

FIG. 15 illustrates an example of enhancing an image using a trained noise model and a trained image enhancement model, according to one or more embodiments. Referring to FIG. 15, a noise model 1510 may estimate a noise distribution 1505 of an input image 1501 based on the input image 1501. For example, the noise model 1510 may estimate the noise distribution 1505 based on pixel data 1502, pixel position information 1503, and capturing parameters 1504 of the input image 1501, for example. The noise distribution 1505 may include a variance or standard deviation of noise values of pixels of the input image 1501.

The pixel data 1502 may include pixel values of the input image 1501, and the pixel position information 1503 may include pixel coordinate values and/or distances from the center, as a non-limiting example. As the pixel data 1502, clean pixel data of a clean version of the input image 1501 may be used. For example, a pseudo clean image may be obtained by applying blur filtering to the input image 1501, and the clean pixel data may be determined from pixel values of the pseudo clean image. The capturing parameters 1504 may include image capturing information of the input image 1501. The noise model 1510 may estimate the noise distribution 1505 based on a distance from the center, for example, of the input image 1501 to each pixel.

An image enhancement model 1520 may generate an enhanced image 1506 based on the input image 1501 and the noise distribution 1505. For example, input data may be generated by concatenating the input image 1501 and the noise distribution 1505, and the image enhancement model 1520 may then generate the enhanced image 1506 based on the input data. The image enhancement model 1520 may be a machine learning model that learns or is trained in advance to have a mapping relationship between the input data corresponding to the input image 1501 and the noise distribution 1505 and output data corresponding to the enhanced image 1506. In addition, the image enhancement model 1520 may be trained in advance based on training images generated through the use of the noise model 1510.

Figure 16:
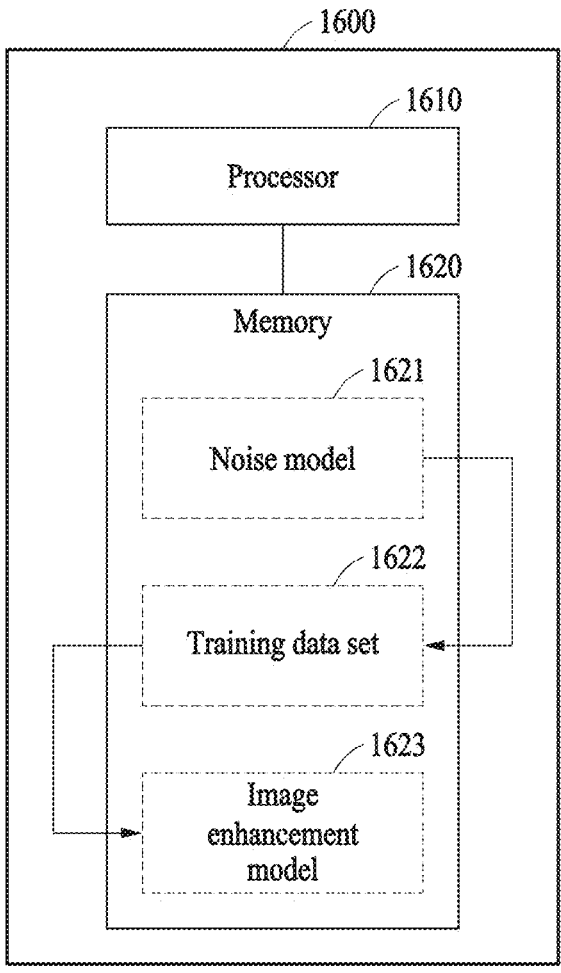
FIG. 16 illustrates an example of an apparatus with training, according to one or more embodiments.

FIG. 16 illustrates an example of an apparatus with training, according to one or more embodiments. Referring to FIG. 16, an apparatus 1600 may include a processor 1610 and a memory 1620, as non-limiting examples. The memory 1620 may be connected to the processor 1610, and may store instructions executable by the processor 1610, data to be computed by the processor 1610, and/or data processed by the processor 1610, as non-limiting examples. For example, the memory 1620 may store a noise model 1621, a training data set 1622, and an image enhancement model 1623. The noise model 1621 and the image enhancement model 1623 may be in-training or trained machine learning models, for example. The memory 1620 may include a non-transitory computer-readable medium, such as a high-speed random-access memory (RAM) and/or nonvolatile computer-readable medium (e.g., one or more disk storage devices, flash memory devices, or other nonvolatile solid-state memory devices), as non-limiting examples.

The processor 1610 may execute instructions that configure the processor 1610 to perform any one, any combination, or all operations described herein with reference to FIGS. 1 through 20. For example, the processor 1610 may be configured to train the noise model 1621 based on training-modeling images and corresponding pixel position information, generate a degraded training image of the clean training image using the noise model 1621, e.g., in the training of the noise model 1621 or by using the trained noise model 1621, determine a training data set 1622 based on the clean training image and the degraded training image, and train the image enhancement model 1623 based on the training data set 1622.

Figure 17:
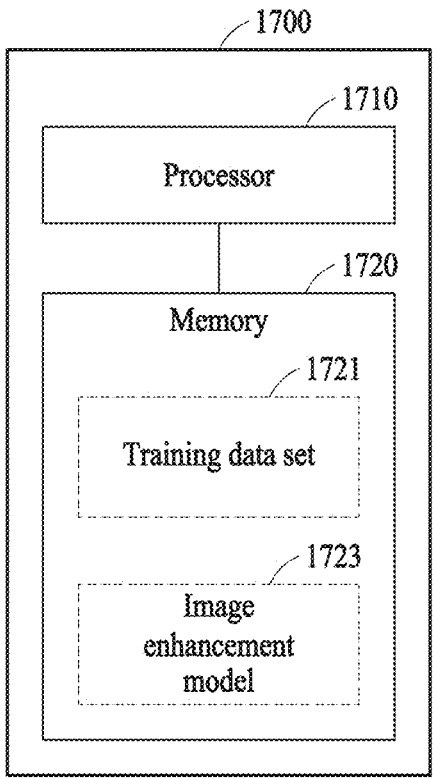
FIG. 17 illustrates an example of an apparatus with image enhancement, according to one or more embodiments.

FIG. 17 illustrates an example of an apparatus with image enhancement, according to one or more embodiments. Referring to FIG. 17, an apparatus 1700 may include a processor 1710 and a memory 1720. The memory 1720 may be connected to the processor 1710, and may store instructions executable by the processor 1710, data to be computed by the processor 1710, and/or data processed by the processor 1710, as non-limiting examples. For example, the memory 1720 may store a noise model 1721 and an image enhancement model 1723, e.g., as respective in-training or trained models. The processor 1710 may execute instructions that may configure the processor 1710 to perform any one, any combination, or all operations described herein with reference to FIGS. 1 through 20. For example, the processor 1710 may receive an input image, estimate a noise distribution of the input image by implementing the trained noise model 1721 based on the input image, and generate an enhanced image by implementing the trained or in-training image enhancement model 1723 based on the input image and the estimated noise distribution.

Figures 18, 19:
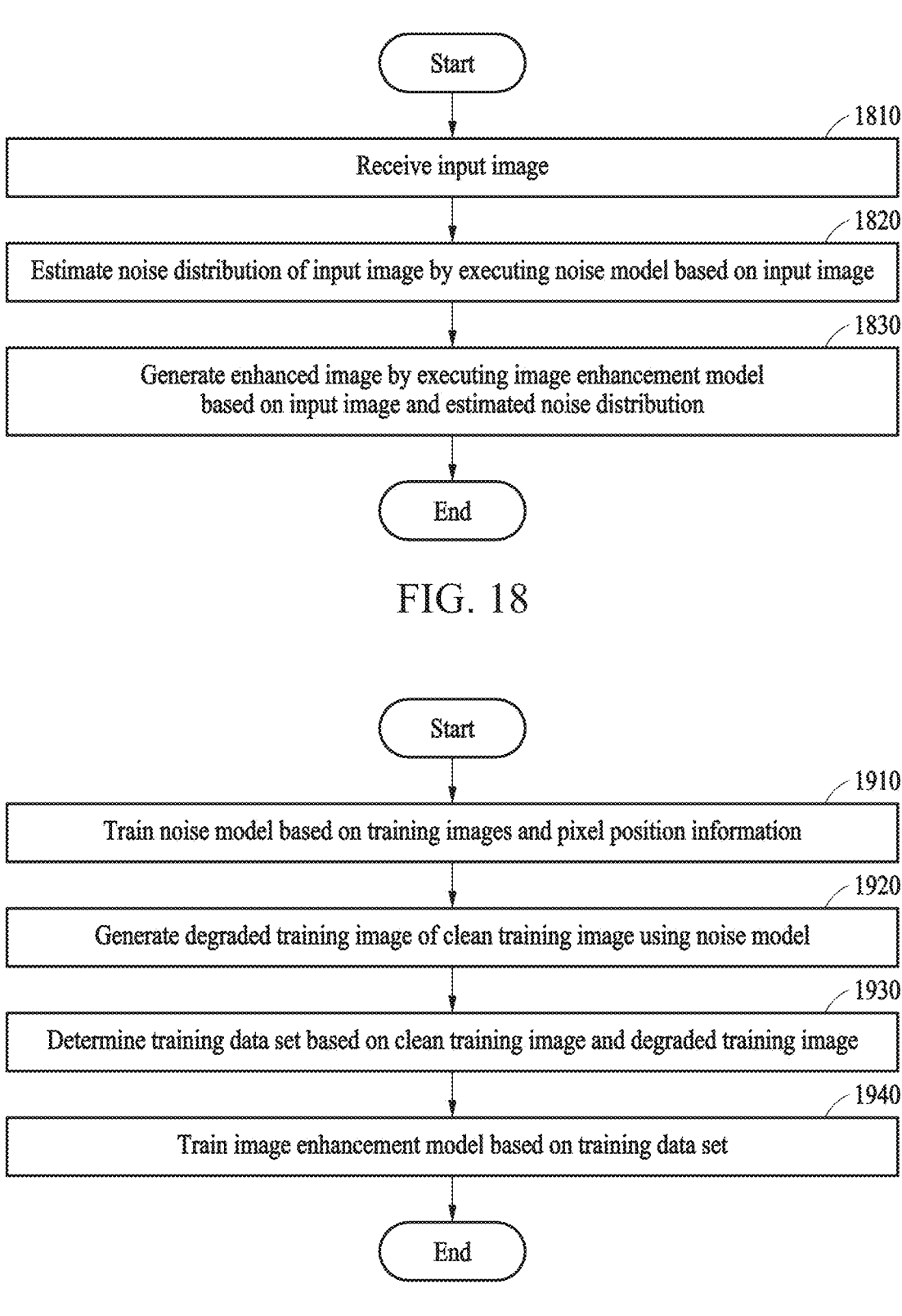
FIG. 18 illustrates an example of a method with image enhancement, according to one or more embodiments.
FIG. 19 illustrates an example of a method with training, according to one or more embodiments.

FIG. 18 illustrates an example of a method with image enhancement, according to one or more embodiments. Referring to FIG. 18, in operation 1810, an apparatus may receive an input image. In operation 1820, the apparatus may estimate a noise distribution of the input image by implementing a noise model based on the input image. For example, the apparatus may implement the noise model (e.g., the trained noise model) based on pixel data, pixel position information, and capturing parameters of the input image. The noise model may be a regression model that learns or is trained in advance to have a mapping relationship between input data corresponding to the pixel data, the pixel position information, and the capturing parameters and output data corresponding to the noise distribution. The capturing parameters may include at least one of an ISO value, an exposure time, and Bayer pattern information, as non-limiting examples. The noise model may estimate the noise distribution of the input image based on a distance from the center, as a non-limiting example, of the input image to each pixel. The noise distribution may include a variance or standard deviation of noise values of pixels of the input image, for example.

In operation 1830, the apparatus may generate an enhanced image by implementing an image enhancement model, e.g., a trained image enhancement model, based on the input image and the estimated noise distribution. For example, the apparatus may generate input data by concatenating the input image and the estimated noise distribution, and implement the image enhancement model using the generated input data. The image enhancement model may be a machine learning model that learns or is trained in advance to have a mapping relationship between the input data corresponding to the input image and the estimated noise distribution and output data corresponding to the enhanced image. For example, the image enhancement model may be trained in advance based on training images generated through the use of the noise model.

FIG. 19 illustrates an example of a method with training, according to one or more embodiments. Referring to FIG. 19, in operation 1910, an apparatus may train a noise model based on training images and corresponding pixel position information. For example, the apparatus may generate a first clean training image from a first noise training image, determine a noise component of the first noise training image based on a difference between the first noise training image and the first clean training image, and train the noise model to have a mapping relationship that is based on a distribution of the noise component, pixel data of the first clean training image, and pixel position information.

The apparatus may determine Gaussian noise pixel data and Gaussian clean pixel data by applying a Gaussian data transformation to first noise pixel data of the first noise training image and first clean pixel data of the first clean training image, and determine the noise component based on a difference between the Gaussian noise pixel data and the Gaussian clean pixel data. The apparatus may derive the mapping relationship based further on capturing parameters of/for the first noise training image including at least one of an ISO value, an exposure time, and Bayer pattern information, as non-limiting examples. The apparatus may remove a clipping effect due to a limitation of representation of pixel values of the training images, through declipping.

In operation 1920, the apparatus may generate a degraded training image of the clean training image by using the noise model, e.g., the trained or in-training noise model. For example, the apparatus may determine a noise distribution corresponding to a degradation condition by providing the clean training image and the degradation condition to the noise model, and generate the degraded training image by applying the noise distribution to the clean training image. The apparatus may apply a blur effect to the clean training image using a blur model.

In operation 1930, the apparatus may determine a training data set based on the clean training image and the degraded training image. The apparatus may generate a training input by concatenating the noise distribution with the degraded training image. In operation 1940, the apparatus may train an image enhancement model based on the training data set.

Figure 20:
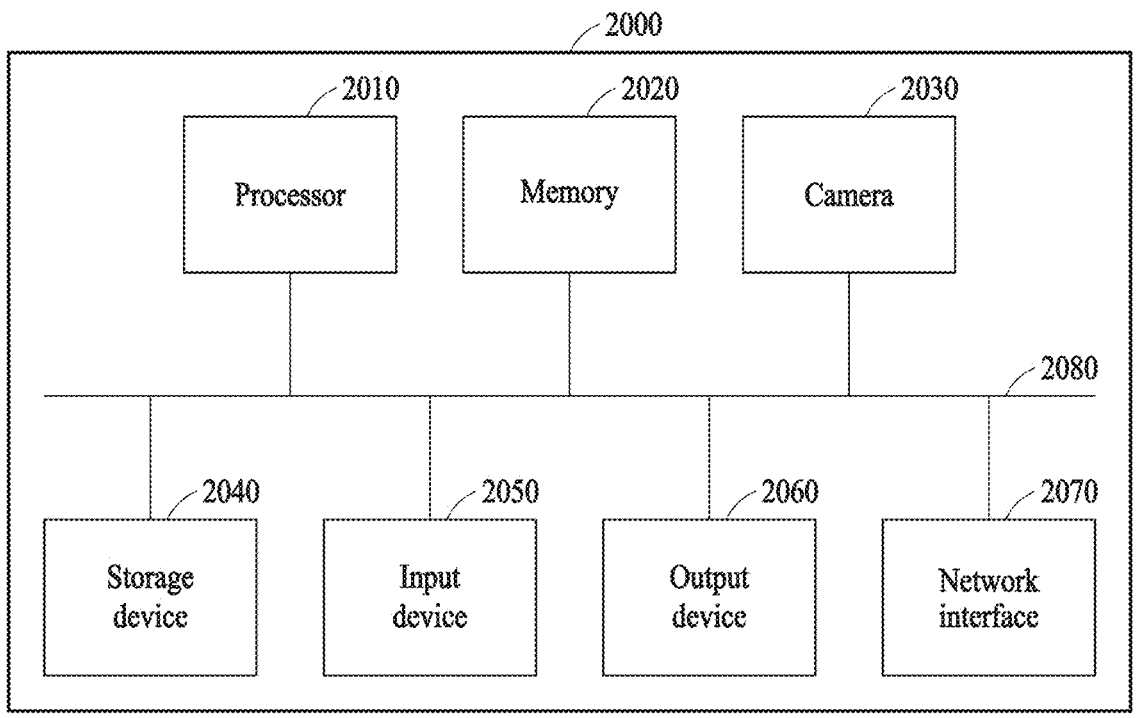
FIG. 20 illustrates an example of an electronic apparatus, according to one or more embodiments.

FIG. 20 illustrates an example of an electronic apparatus, according to one or more embodiments. Referring to FIG. 20, an electronic apparatus 2000 may include a processor 2010, a memory 2020, a camera 2030, a storage device 2040, an input device 2050, an output device 2060, and a network interface 2070, and these components may communicate with one another through a communication bus 2080. For example, the electronic apparatus 2000 may be, or implemented as at least a portion of, for example, a mobile device such as a mobile phone, a smartphone, a personal digital assistant (PDA), a netbook, a tablet computer, a laptop computer, and the like, a wearable device such as a smart watch, a smart band, smart glasses, and the like, a computing device such as a desktop, a server, and the like, a home appliance such as a television (TV), a smart TV, a refrigerator, and the like, a security device such as a door lock and the like, and a vehicle such as an autonomous vehicle, a smart vehicle, and the like, as non-limiting examples. The electronic apparatus 2000 may be the electronic apparatus 1 of FIG. 1, or include, structurally and/or operationally, the image enhancement apparatus 100 of FIG. 1, the apparatus 1600 of FIG. 16, the apparatus 1700 of FIG. 17, and/or any other or all components, devices, and hardware discussed herein with respect to FIGS. 1-20.

The processor 2010, e.g., one or more processors, may implement various operations in the electronic apparatus 2000. For example, the processor 2010 may process or execute instructions stored in the memory 2020 or the storage device 2040, which when executed by the processor 2010 may configure or cause the processor 2010 to implement or perform any one, any combination, or all operations or methods described herein. The memory 2020 may include a computer-readable storage medium or device. The memory 2020 may store such instructions that may be executed by the processor 2010, and related information such as any or all in-training and/or trained models described herein, and such instructions may be executed by the processor 2010 based on such related information, e.g., while other software and/or applications of the electronic apparatus 2000 are being executed by the electronic apparatus 2000, such as for control of any or all remaining components of the electronic apparatus 2000.

The camera 2030, e.g., one or more cameras 2030, may capture image(s) and/or video(s). Such an image and/or video may correspond to a captured image, a training image, and/or an input image, as non-limiting example. The image (s) and/or video(s) may be stored in the memory 2020 and/or the storage device 2040, temporarily or non-temporarily The storage device 2040 may include a computer-readable storage medium or device. The storage device 2040 may store a greater or great amount of information than the memory 2020 and may store the information for a longer or long period of time. The storage device 2040 may include, for example, a magnetic hard disk, an optical disc, a flash memory, a floppy disk, or other types of nonvolatile memory.

The input device 2050 may receive an input from a user through an input method using a keyboard, a mouse, a touch input, a voice input, and/or an image input, as non-limiting examples. The input device 2050 may include, as non-limiting examples, a keyboard, a mouse, a touchscreen, a microphone, and/or any other device that detects an input from a user. The input device 2050 may be a component of the electronic apparatus 2000 and/or a component connected to or for the electronic apparatus 2000 that transmits or otherwise provides the detected input to the electronic apparatus 2000. The output device 2060 may provide an output of the electronic apparatus 2000 to a user through a visual, auditory, and/or tactile channel, as non-limiting examples. The output device 2060 may include, for example, a display, a touchscreen, a speaker, a vibration generating device, and/or any other device that provides an output to a user. The output device 2060 may be a component of the electronic apparatus 2000 and/or a component connected to or for the electronic apparatus 2000 that transmits or otherwise provides the output from the electronic apparatus 2000. The network interface 2070 may communicate with external device(s) through a wired and/or wireless network, for example. As non-limiting more detailed description examples of the electronic apparatus 1 and/or 2000, what is described above with reference to FIGS. 1 through 19 may also be applicable to FIG. 20, e.g., the electronic apparatus may include any one, any combination, or all apparatuses described above, and may implement any one, any combination, or all operations or methods described above.

The image enhancement apparatuses, the apparatuses with image enhancement, the apparatuses with training, the electronic apparatus, memories or memory devices, storages or storage devices, processors, network interfaces, cameras, input devices, output devices, communication buses, and other apparatuses, devices, units, modules, and components described herein with respect to FIGS. 1-20 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-20 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method with image enhancement, comprising:
    obtaining an input image;
    estimating a noise distribution of the input image by implementing a noise model based on pixel data of the input image, pixel position information of the input image representing pixel coordinate values and distances from a center of the input image; and
    generating an enhanced image by implementing an image enhancement model dependent on the input image and the estimated noise distribution.

2. The method of claim 1, wherein the obtaining of the input image includes capturing the input image using a camera.

3. The method of claim 1, wherein the estimating of the noise distribution comprises implementing the noise model based on capturing parameters of the input image.

4. The method of claim 3, wherein the capturing parameters comprise, related to the input image, at least one of an International Organization for Standardization (ISO) value, an exposure time, and Bayer pattern information.

5. The method of claim 3,
    wherein the noise model is a regression model that has been trained in advance of the obtaining of the input image, and
    wherein the noise model provides a mapping relationship between input image data, the pixel position information of the input image data, and corresponding capturing parameters for the input image data, and outputs noise distribution data.

6. The method of claim 3, further comprising generating the noise model by training an in-training noise model to have a mapping relationship between input image data, the pixel position information of the input image data, and corresponding capturing parameters for the input image data, and to output noise distribution data.

7. The method of claim 6, further comprising generating the image enhancement model by training an in-training image enhancement model to have a mapping relationship between an output enhanced image data and the input image data, the pixel position information of the input image data, and the corresponding capturing parameters for the input image data.

8. The method of claim 1, wherein the noise model is an in-training noise model and/or the image enhancement model is an in-training image enhancement model.

9. The method of claim 1, wherein the noise model is configured to estimate the noise distribution of the input image based on respective distances from the center of the input image to each of a plurality of pixels of the input image.

10. The method of claim 1, wherein the noise distribution comprises a variance or standard deviation of noise values of pixels of the input image.

11. The method of claim 1, wherein the generating of the enhanced image comprises:

generating input data by concatenating the input image and the estimated noise distribution; and implementing the image enhancement model with the generated input data.

12. The method of claim 1, wherein the image enhancement model is a machine learning model that has been trained in advance of the obtaining of the input image, and wherein the trained enhancement model provides a mapping relationship between input image data and a corresponding estimated noise distribution and outputs enhanced image data.

13. The method of claim 1, further comprising generating the image enhancement model by training the image enhancement model based on training degraded images, generated through use of the noise model, and training clean images corresponding to the training degraded images.

14. A non-transitory computer-readable storage medium storing instructions that, when executed by a processor, cause the processor to perform the method of claim 1.

15. An apparatus with image enhancement, comprising:

a processor configured to:

estimate a noise distribution for an obtained input image by implementing a noise model based on pixel data of the input image, pixel position information representing pixel coordinate values and distances from a center of the input image, and capturing parameters of the input image; and generate an enhanced image by implementing an image enhancement model, for the input image, dependent on the input image and the estimated noise distribution.

16. The apparatus of claim 15, wherein the noise model is a trained or in-training noise model, and/or the image enhancement model is a trained or in-training image enhancement model.

17. The apparatus of claim 15, further comprising:

a camera that obtains the input image; and a memory storing instructions, which when executed by the processor, configures the processor to perform the estimating of the noise distribution and the generating of the enhanced image, wherein the apparatus is a mobile phone electronic device.

18. An electronic apparatus, comprising:

a camera that captures an input image; and a processor configured to:

estimate a noise distribution of the input image by an implementation of a noise model that considers pixel information of the input image, pixel position information representing pixel coordinate values and distances from a center of the input image, and considers capturing parameters of the camera when the input image was captured and/or plural respective pixel position information of the input image; and generate an enhanced image of the input image by an implementation of an image enhancement model, where the implementation of the image enhancement model is dependent on the input image and the estimated noise distribution.

19. The electronic apparatus of claim 18, wherein the electronic apparatus is a mobile phone.

* * * * *